(12) United States Patent
Lee et al.

(10) Patent No.: US 10,549,801 B2
(45) Date of Patent: Feb. 4, 2020

(54) BICYCLE LOCKING DEVICE AND LOCKING METHOD

(71) Applicant: BISECU INC., Gyeonggi-do (KR)

(72) Inventors: Jong Hyun Lee, Gyeonggi-do (KR); Jung Ho Hyun, Gyeonggi-do (KR); Ji Soon Kang, Gyeonggi-do (KR)

(73) Assignee: BISECU INC., Gyeonggi-do (KR)

( * ) Notice: Subject to any disclaimer, the term of this patent is extended or adjusted under 35 U.S.C. 154(b) by 0 days.

(21) Appl. No.: 16/158,929

(22) Filed: Oct. 12, 2018

(65) Prior Publication Data
US 2019/0047647 A1 Feb. 14, 2019

Related U.S. Application Data

(63) Continuation of application No. PCT/KR2017/008588, filed on Aug. 9, 2017.

(30) Foreign Application Priority Data

Aug. 31, 2016 (KR) .......................... 10-2016-0111446
May 30, 2017 (KR) .......................... 10-2017-0066546

(51) Int. Cl.
E05B 17/22 (2006.01)
B62H 5/20 (2006.01)
(Continued)

(52) U.S. Cl.
CPC ............... B62H 5/20 (2013.01); E05B 17/22 (2013.01); E05B 45/06 (2013.01);
(Continued)

(58) Field of Classification Search
CPC .......... B62H 5/20; B62H 5/141; B62H 5/148; E05B 45/06; E05B 47/00; E05B 47/002;
(Continued)

(56) References Cited

U.S. PATENT DOCUMENTS 1,219,789 A * 3/1917 Talbott et al. .......... B60R 25/09
188/31
1,359,419 A * 11/1920 O'Brien .................. B60R 25/09
188/31
(Continued)

FOREIGN PATENT DOCUMENTS

CN 101574986 A 11/2009
CN 104875818 A 9/2015
(Continued)

OTHER PUBLICATIONS

Notice of Allowance issued in related Korean Patent Application No. 10-2017-0066546 dated Sep. 14, 2018.
(Continued)

Primary Examiner — Suzanne L Barrett
(74) Attorney, Agent, or Firm — Studebaker & Brackett PC

(57) ABSTRACT

The present disclosure relates to a bicycle locking device and method, and includes a fastening part including an inner fastening member positioned on an inner surface of a bicycle hub, and an outer fastening member positioned on an outer surface of the hub and coupled to the inner fastening member; a driving part coupled to one side surface of the outer fastening part and including a motor and an outer case; and a locking part including a pin case, a pin positioned in the pin case, a pin case cover coupled to the upper end of the pin case, and a first spring coupled to the pin case cover and the pin to support the pin so that the pin is pitchable with respect to the pin case.

18 Claims, 12 Drawing Sheets

(51) Int. Cl.
    *E05B 45/06*    (2006.01)
    *E05B 71/00*    (2006.01)
    *E05B 47/00*    (2006.01)
    *G01P 15/14*    (2013.01)
(52) U.S. Cl.
    CPC .......... *E05B 47/0002* (2013.01); *E05B 71/00* (2013.01); *G01P 15/14* (2013.01); *E05B 2047/002* (2013.01); *E05B 2047/0072* (2013.01)
(58) Field of Classification Search
    CPC .... E05B 71/00; E05B 17/22; E05B 2047/002; E05B 2047/0072; G01P 15/00; B62J 2099/002
    USPC .................................. 70/277, 225–227, 233
    See application file for complete search history.

(56)        References Cited

U.S. PATENT DOCUMENTS

| 1,434,156 | A | * | 10/1922 | Schnaars | B60R 25/06 70/188 |
| 1,566,405 | A | * | 12/1925 | Jones | B60R 25/09 188/31 |
| 2,212,428 | A | * | 8/1940 | Watters | B62H 5/141 70/134 |
| 2,302,654 | A | * | 11/1942 | Leksutin | B62H 5/141 70/227 |
| 4,028,915 | A | * | 6/1977 | Stahl | B62K 25/02 70/233 |
| 5,133,201 | A | * | 7/1992 | LaMott | B60R 25/09 188/265 |
| 5,941,105 | A | * | 8/1999 | Macey | B60R 25/09 301/111.02 |
| 9,169,673 | B2 | * | 10/2015 | Chen | E05B 71/00 |
| 2002/0108411 | A1 | * | 8/2002 | Cardwell | B60R 25/005 70/226 |
| 2008/0041127 | A1 | * | 2/2008 | Xavier | B62H 5/141 70/228 |
| 2011/0226709 | A1 | * | 9/2011 | Yen | B62H 3/04 211/17 |
| 2016/0016626 | A1 | * | 1/2016 | Thompson | B62M 6/45 701/22 |
| 2017/0069154 | A1 | * | 3/2017 | Hilton | G07C 9/00182 |
| 2018/0118294 | A1 | * | 5/2018 | Anuth | B62H 5/003 |

FOREIGN PATENT DOCUMENTS

| GB | 191307225 A | 10/1913 |
| JP | 2015086633 | 5/2015 |
| KR | 20110021363 | 3/2011 |
| KR | 20110126806 | 11/2011 |
| KR | 101192587 | 10/2012 |
| KR | 20150129543 | 11/2015 |
| WO | 2011/010768 A1 | 1/2011 |

OTHER PUBLICATIONS

International Search Report issued in related International Patent Application No. PCT/KR2017/008588 dated Nov. 17, 2017 and English translation of same.

International Written Opinion issued in related International Patent Application No. PCT/KR2017/008588 dated Nov. 17, 2017.

* cited by examiner

BICYCLE LOCKING DEVICE AND LOCKING METHOD

PRIORITY CLAIM

The present application is a continuation of International Application Number PCT/KR2017/008588 filed on Aug. 9, 2017, which claims priority to Korean Patent Application Nos. 10-2016-0111446 filed on Aug. 31, 2016 and 10-2017-0066546 filed on May 30, 2017 in the Korean Intellectual Property Office, and all the benefits accruing therefrom under 35 U.S.C. § 119, the disclosure of which is incorporated herein by reference in its entirety.

FIELD OF THE INVENTION

The present invention relates to a bicycle locking device and a method of locking a bicycle, and more particularly, to a bicycle locking device using wireless communication configured to measure a distance between a user and the locking device to automatically operate in a locking mode when the distance deviates from a standard distance, and a method of locking a bicycle.

BACKGROUND

Recently, since traffic congestion and environmental pollution become severe due to an increase of the number of vehicles, various policies have been pushed ahead by a government or a local government so that use of bicycles can be invigorated as a local transportation.

Further, a ratio of occurrence of obesity, adult diseases, etc. increases to modern people having insufficient exercise, and bicycles have been in spotlight to prevent the above. Accordingly, bicycle road networks nationally increase, and people using bicycles to commute increase.

However, since a weight of a bicycle is not heavy and expensive bicycles are widely distributed in the market recently, thefts of bicycles annually increase, and the above has been raised as one of social problems.

A conventional bicycle locking device has been developed and distributed in a form of being locked after fastening a chain or wire to a parking rack or between wheels, and in order to move a parked bicycle, a lock installed at the bicycle has to be unlocked and the chain or wire has to be released. Further, there is a problem of inconvenience for using a locking device because a chain or wire to which a lock is added has to be separately stored or wound around a bicycle body.

In addition, although a bicycle locking device of which durability is improved to prevent the robbery has been developed, since the weight and thickness increase to improve the durability, user inconvenience has been caused.

SUMMARY

The present invention is directed to providing a bicycle locking device which is linked with Bluetooth to automatically operate in a locking mode to solve inconvenience for coupling and disassembling through measuring and comparing signal intensity when a bicycle user departs from a bicycle and which does not need to be carried.

Further, the present invention is directed to providing a bicycle locking device in which a pin and a groove are engaged due to predetermined rotation of a wheel even when the pin is not accurately coupled to a coupling groove of the locking device through double springs.

It should be noted that objects of the present invention are not limited to the above-mentioned objects, and other objects of the present invention will be apparent to those skilled in the art from the following descriptions.

A bicycle locking device according to an embodiment of the present invention includes: a fastening part including an inner fastening member positioned on an inner side surface of a bicycle hub, and an outer fastening member positioned on an outer side surface of the hub and coupled to the inner fastening member; a driving part coupled to one side surface of the outer fastening part and including a motor and an outer case; and a locking part including a pin case, a pin positioned in the pin case, a pin case cover coupled to an upper end of the pin case, and a first spring coupled to the pin case cover and the pin to support the pin to be pitchable with respect to the pin case, wherein the locking part is located in the driving part, the pin case connected to the motor moves in a frontward direction and thus the pin is inserted into a groove of the outer fastening member to prevent rotation of the hub when the motor is operated by a driving signal applied thereto, and the pin is easily inserted into the groove of the outer fastening member by an elastic force of the first spring when a bicycle wheel has predetermined rotation.

A bicycle locking method may be provided as another embodiment of the present invention.

The bicycle locking method according to another embodiment of the present invention includes: measuring signal intensity of wireless communication between a bicycle locking device and a user device; comparing the measured signal intensity with a predetermined standard intensity; and allowing the bicycle locking device to operate in a locking mode when the measured signal intensity is less than the standard intensity as a comparison result.

Meanwhile, a computer-readable recording medium on which a program configured to execute the above-described method in a computer is recorded may be provided.

Other details of the present invention are included in the detailed description and accompanying drawings which will be described below.

A bicycle locking device according to an embodiment of the present invention can be linked with Bluetooth and automatically operate in a locking mode and an unlocking mode to solve inconvenience for coupling and disassembling.

Further, people except for a user cannot separate a cover of the locking device because the cover is connected to a pin, and a theft prevention message can be transmitted to a user to reduce a theft possibility of a bicycle when a variation amount greater than or equal to a standard value is sensed by measuring an acceleration variation amount in real time through an acceleration sensor.

It should be noted that effects of the present invention are not limited to the above-mentioned effects, and more various effects are included in the description. Other effects of the present invention will be apparent to those skilled in the art from descriptions in the claims.

DETAILED DESCRIPTION

Figure 1:
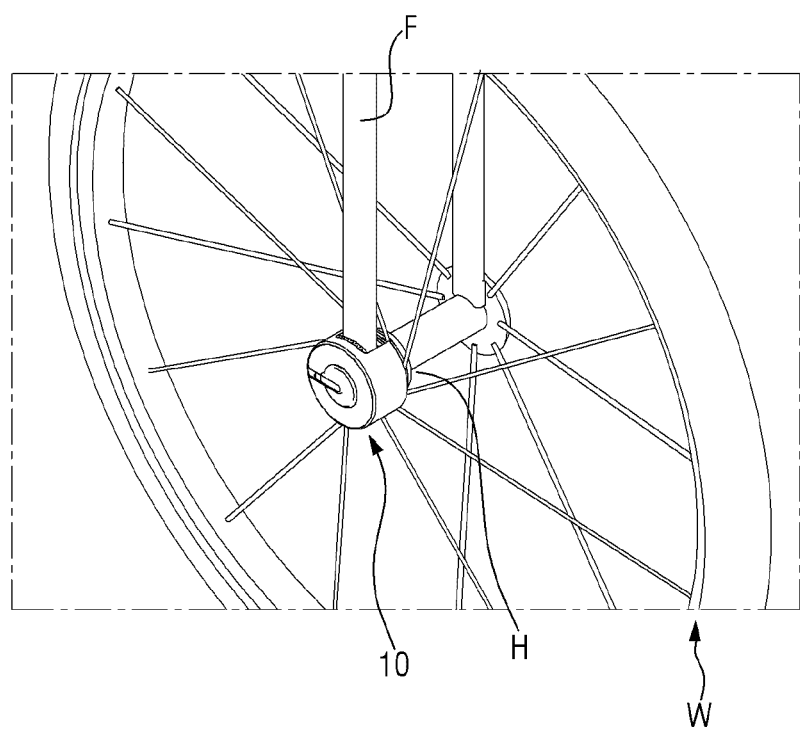
FIG. 1 is a view illustrating a state in which a bicycle locking device according to an embodiment of the present invention is coupled to a bicycle hub and a shaft or fork of a bicycle wheel.

Hereinafter, exemplary embodiments of the present invention will be described in detail with reference to the accompanying drawings which may allow one of ordinary skill in the art to easily perform the present invention. The present invention may be implemented in various forms and is not limited to the following embodiments. Further, components not related to the description are omitted in the drawings to clearly describe the present invention, and similar reference symbols are used for similar components in the description.

Terms used in the description will be briefly described, and the present invention will be described in detail.

General terms currently widely used are used as terms used in the description in consideration of functions in the present invention, but may be changed according to a purpose of those skilled in the art, a precedent, appearance of a new technology, or the like.

Further, terms arbitrarily selected by an applicant exist in a particular case, and in this case, meanings of the terms will be disclosed in a description of the corresponding invention in detail. Accordingly, terms used in the present invention has to be defined on the basis of not simple names of the terms but the meanings of the terms and contents throughout the present invention.

In the whole description, a case in which one part "includes" one component means not precluding other components but further including other components unless specifically stated otherwise. Further, terms such as ". . . part", "module", and the like disclosed in the description mean units which process at least one function or operation, and the above may be implemented in hardware or software, or implemented in coupling of hardware and software. In addition, in the whole description, a case in which one part is "connected to" another part includes not only a case of "direct connection", but also a case of "connection via other elements interposed therebetween".

Recently, since traffic congestion and environmental pollution become severe due to an increase of the number of vehicles, various policies have been pushed ahead by a government or a local government so that use of bicycles may be invigorated as a local transportation.

Further, a ratio of occurrence of obesity, adult diseases, etc. increases to modern people having insufficient exercise, and bicycles have been in spotlight to prevent the above. Accordingly, bicycle road networks nationally increase, and people using bicycles to commute increase.

However, since a weight of a bicycle is not heavy and expensive bicycles are widely distributed in the market recently, thefts of bicycles annually increase, and the above has been raised as one of social problems.

Hereinafter, the present invention will be described in detail with reference to the accompanying drawings.

FIG. 1 is a view illustrating a state in which a bicycle locking device 10 according to an embodiment of the present invention is coupled to a bicycle hub H and a shaft or a fork F of a bicycle wheel W.

The bicycle locking device 10 according to the embodiment of the present invention may be made of an aluminum alloy material and thus may have a light weight and superior strength, but is not limited thereto.

Further, the bicycle locking device 10 may have at least one of a waterproof function and a dust protection function.

The bicycle locking device 10 according to the embodiment of the present invention is not limitedly applied to particular kinds of bicycles, and may be applied to the bicycle wheels W having various sizes and various shapes.

Figure 2:
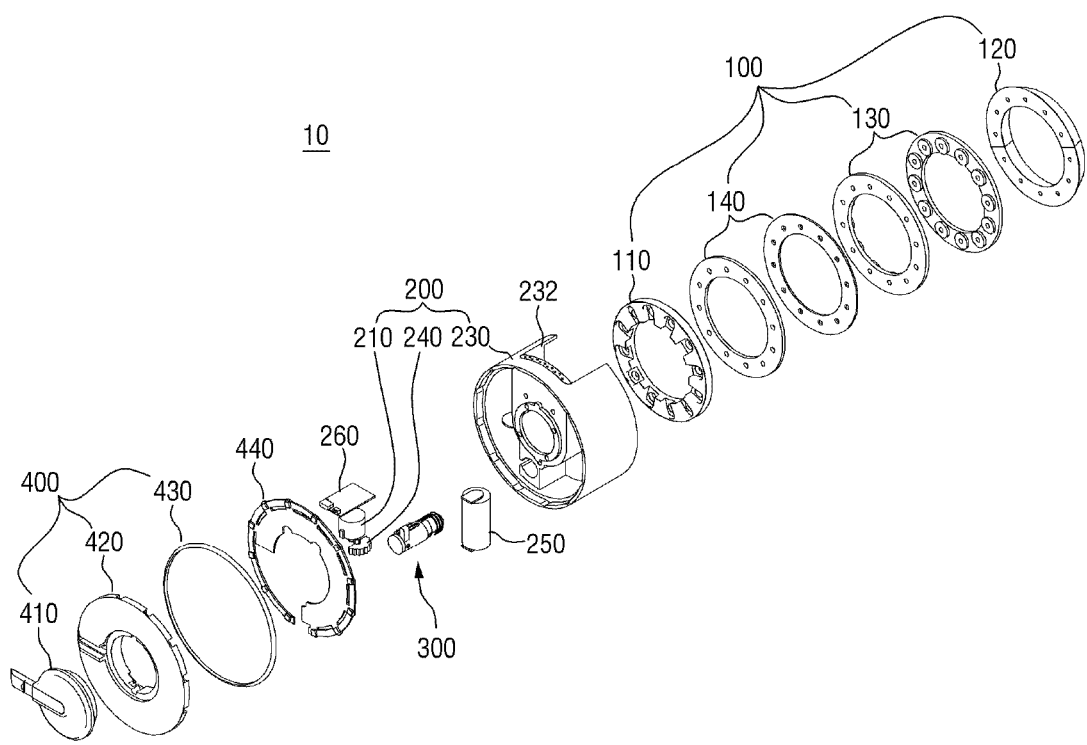
FIG. 2 is an exploded view illustrating inner and outer configurations of the bicycle locking device according to the embodiment of the present invention.
Figure 3:
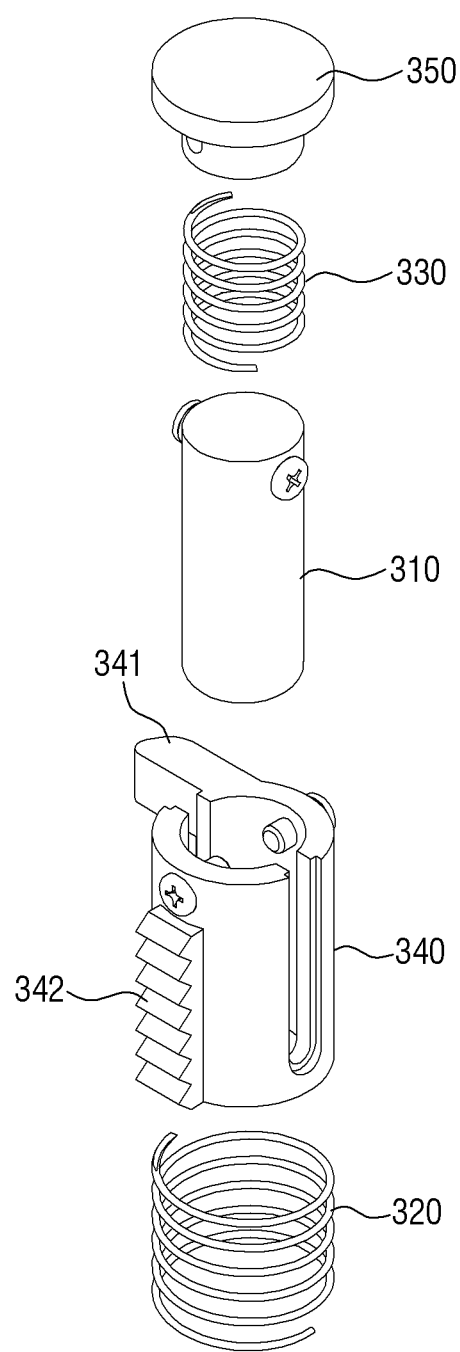
FIG. 3 is a view illustrating the inner configuration of a locking part according to the embodiment of the present invention.
Figure 4:
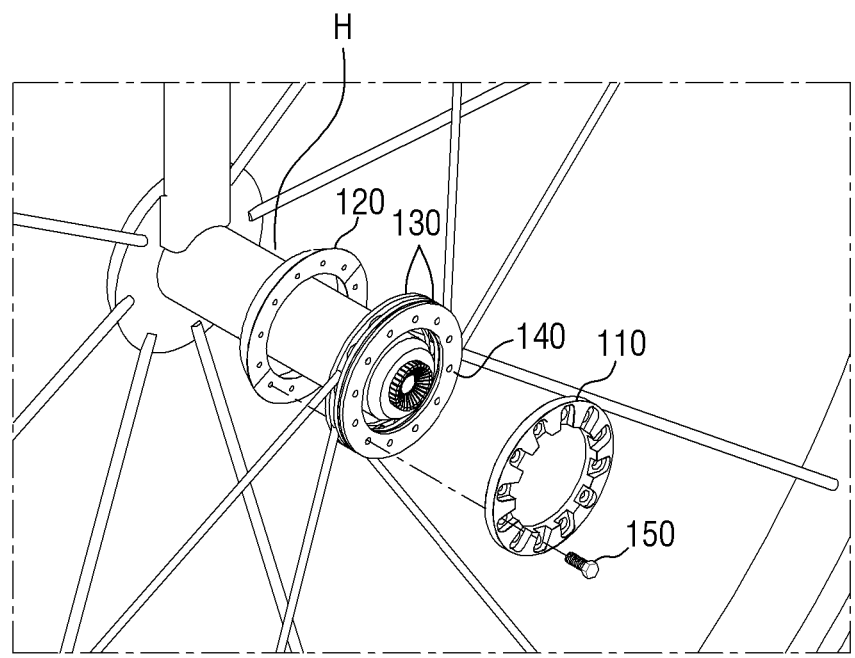
FIG. 4 is a view illustrating a state in which a fastening part and the bicycle hub according to the embodiment of the present invention are coupled.

FIG. 2 illustrates inner and outer configurations of the bicycle locking device 10 according to the embodiment of the present invention, FIG. 3 is a view illustrating an inner configuration of a locking part 300 according to the embodiment of the present invention, and FIG. 4 is a view illustrating a state in which a fastening part 100 and the bicycle hub H according to the embodiment of the present invention are coupled.

The bicycle locking device 10 may be provided as the embodiment of the present invention.

Referring to FIGS. 1 to 4, the bicycle locking device 10 according to the embodiment of the present invention may include a fastening part 100 including an inner fastening member 120 positioned on an inner side surface of the bicycle hub H, and an outer fastening member 110 positioned on an outer side surface of the hub H and coupled to the inner fastening member 120, a driving part 200 coupled to one side surface of the outer fastening member 110 and including a motor 210, a gear 240, and an outer case 230, and the locking part 300 located in the driving part 200 and including a pin case 340, a pin 310 positioned in the pin case 340, a pin case cover 350 coupled to an upper end of the pin case 340, and a first spring 330 coupled to the pin case cover 350 and the pin 310 to support the pin 310 to be pitchable with respect to the pin case 340, the locking part 300 may be located in the driving part 200, and the pin case 340 connected to the motor 210 may move in a frontward direction and thus the pin 310 may be coupled to a groove 111 of the outer fastening member 110 to prevent rotation of the hub H when the motor 210 is operated by a driving signal applied thereto.

The fastening part 100 may further include two rubber pads 130 between the inner fastening member 120 and the outer fastening member 110. As shown in FIG. 4, one rubber pad 130 is disposed on each of the inner side surface and the outer side surface of the hub H to prevent shock applied to a spoke, and improve a coupling force of the fastening part 100 to the hub H, and increase friction to prevent dislocation of a center of the fastening part 100 while being used.

Further, the fastening part 100 may include at least one spacer 140 between the inner fastening member 120 and the rubber pad 130 disposed on the outer side surface of the hub H. The spacer 140 is necessary for adjusting a location of the outer fastening member 110, and is used to maintain an appropriate interval between the outer fastening member 110 and the outer case 230 in which the pin 310 can be coupled to and separated from the outer fastening member 110 according to driving of the driving part 200. A user may dispose the spacer 140 between the outer fastening member 110 and the rubber pad 130 as many as necessary, and fasten the outer fastening member 110, the spacer 140, the rubber pad 130, and the inner fastening member 120 using a bolt 150 to couple the fastening part 100 to the hub H in a state in which the outer fastening member 110 is disposed at an appropriate position.

The bicycle locking device 10 according to the embodiment of the present invention may include an LED cover 430 configured to cover an LED module 530 to radiate light from an LED.

Further, a cover part 400 may include a first cover 410 and a second cover 420, and the LED cover 430 may be located between the second cover 420 and the outer case 230.

In addition, a PCB substrate 440 may be disposed between the LED cover 430 and the outer case 230, and a battery 250 configured to supply power and electronic components may be connected to the PCB substrate 440. A controller (not shown) and a communication part (not shown) may be connected to the PCB substrate 440, and the motor 210 of the driving part 200 may also receive power and a driving signal from the PCB substrate 440.

A pattern or a chip antenna (not shown) may be further provided in the PCB substrate 440 to be used for wireless communication of the bicycle locking device 10 according to the present invention.

The outer case 230 included in the driving part 200 may be formed in a cylindrical shape to accommodate elements of the bicycle locking device 10 such as the locking part 300 and the like therein, and may have one open surface to accommodate a partial area of the outer fastening member 110. Further, an opening part 232 may be formed in a side surface of the outer case 230 to allow the fork F to pass therethrough and be coupled to each other. Accordingly, the fastening part 100 is coupled to the hub H of the rotating wheel W, and the driving part 200 and the locking part 300 are coupled to the fixed fork F to have relative movement to each other.

The bicycle locking device 10 according to the embodiment of the present invention may have a cylindrical structure as shown in the drawings, but is not limited thereto and may have various structures.

The outer fastening member 110 and the inner fastening member 120 configuring the fastening part 100 of the bicycle locking device 10 according to the embodiment of the present invention may use a fastening device such as the bolt 150, a screw, or the like to be coupled to the hub H of the bicycle. The hub H which is coupled may be a hub H located at a front wheel W of the bicycle but is not limited thereto, and may also be a hub H of a rear wheel W. Further, when the fastening part 100 may integrally rotate with the wheel W of the bicycle, the fastening part 100 may be coupled to the spoke configured to surround the hub H.

The outer fastening member 110 and the inner fastening member 120 coupled to the hub H of the wheel W may rotate with the coupled wheel W while driving.

As shown in the drawings, the outer fastening member 110 and the inner fastening member 120 may each be formed in a torus shape to surround the hub H located at a center of each fastening part 100. However, the outer fastening member 110 is coupled to the outer side surface of the hub H and thus may have a recess, formed in a disk shape and having a concave center, therein, and the fastening parts 100 in various shapes not limited to the above may be formed.

As shown in FIG. 3, the locking part 300 of the bicycle locking device 10 according to the present invention may have a double spring structure. The locking part 300 includes a first spring 330 and a second spring 320 located opposite to each other on the basis of the pin 310 to have the double spring structure.

The first spring 330 is connected to the pin 310 included in the pin case 340 and an inner side surface of the pin case cover 350 coupled to cover one end of the pin case 340 to support the pin 310 to be pitchable with respect to the pin case 340. Accordingly, the pin 310 and the pin case 340 may have relative movement to each other.

The second spring 320 is connected to a lower end of the pin case 340 and the inside of the outer case 230. Accordingly, the second spring 320 is compressed when the pin case 340 moves toward the outer fastening member 110, and returns to an original location by applying an elastic force to the pin case 340 when a driving force is not transferred to the pin case 340. Accordingly, the locking part 300 may always maintain an unlocked state due to the second spring 320 without an operation of the motor 210.

A rack 342 with which the gear 240 may be engaged may be formed on an outer side surface of the pin case 340. The rack 342 is arranged in a longitudinal direction of the pin case 340. Since the engaged gear 240 rotates and thus the rack 342 is moved along the longitudinal direction of the pin case 340, the entire pin case 340 may move in a straight line along the longitudinal direction. Although interaction between the gear 240 and the rack 342 is used as a method of driving the locking part 300 in the embodiment of the present invention, linear driving of the locking part 300 may be implemented in various methods such as a method of using a driving arm connected to the motor and a protrusion connected to the driving arm, a method of using a worm gear and a lead screw, and the like which are not limited to the above.

Further, a pin case protrusion 341 may be formed to protrude from the outer side surface of the pin case 340. The pin case protrusion 341 may be formed on the pin case 340 as shown in the embodiment of the present invention, but may also be formed on the pin case cover 350. An action of the pin case protrusion 341 may be described below in descriptions of FIGS. 9 to 11.

The bicycle locking device 10 according to the embodiment of the present invention may further include the controller configured to control an operation of the driving part 200 and the communication part connected to a user device (not shown) through wireless communication, and the communication part may receive a driving signal from the user device to transfer the driving signal to the controller.

Further, the communication part may be connected to the user device through Bluetooth, and when signal intensity of the Bluetooth is measured to be lower than or equal to a predetermined value, the controller may control the operation of the driving part to lock the bicycle. In this case, the signal intensity of the Bluetooth may be a received signal strength indicator (RSSI).

The user device in the description may refer to a smart phone, and in this case, a locked state of the bicycle locking device 10 according to the embodiment of the present invention, a remaining capacity of the battery 250, and the like may be displayed through an application of the smart phone, and a shortage of the capacity of the battery 250 may be notified to a user through notification.

Further, the user device may adjust a standard intensity of the Bluetooth, locking operation scope, and the like of the bicycle locking device 10 according to the embodiment of the present invention through a change of application setting.

The bicycle locking device 10 according to the embodiment of the present invention may further include an acceleration sensor, and use the acceleration sensor to measure an acceleration variation amount of each axis in the locked state, and when the measured variation amount is greater than or equal to a predetermined standard value, a theft prevention message may be transferred to the user device and a theft alarm may ring.

The above-described acceleration sensor may include a multiple axis acceleration sensor, a geomagnetic sensor, and a gyro sensor but is not limited thereto.

The acceleration sensor serves to calculate a velocity increase/decrease ratio of linear movement in a particular direction to sense the movement. In other words, the acceleration sensor is provided to output the magnitude of acceleration applied to an object, and a three-axis acceleration sensor of which the scope has three axial directions may measure acceleration in a three dimensional space having directions of three axes x, y, z. In this case, a three-axis acceleration value which is an output value of the three-axis acceleration sensor may be indicated as $g=(gx, gy, gz)$.

The geomagnetic sensor serves to detect an azimuth using a geomagnetic field to sense four cardinal points. Since three sensors capable of measuring magnetic field intensity are formed in the geomagnetic sensor in the x, y, and z directions, a magnetic field direction which influences the sensor is measured using an output between the three sensors. In this case, a three-axis magnetic field value which is an output value of the geomagnetic sensor may be indicated as $m=(mx, my, mz)$.

The gyro sensor is a sensor configured to measure a movement amount of an angle of an object for a sampling time (for example, for one second) by detecting an angular velocity. Specifically, a Coriolis force is generated when the object moves, and the gyro sensor may use a formula of the Coriolis force to sense an angular velocity applied to an inertial system. In this case, a three-axis angular velocity value may be gained with an output value of the gyro sensor.

Further, when a variation amount of the measured acceleration is greater than or equal to a standard variation amount or the measured angular velocity is greater than or equal to a standard angular velocity and thus the controller determines that a theft situation has occurred, lighting may be performed or a sound such as a buzzer or the like may be output through the LED module or a sound output module, and when it is determined not to be the theft situation any longer from the variation amount of the measured acceleration or angular velocity, an operation of the LED module or the sound output module may be stopped. Further, the user may stop the operation of the LED module or the sound output module through the user device.

In addition, in a bicycle driving mode, that is, in the unlocked state, bicycle driving tracking may be automatically started through the acceleration sensor, the gyro sensor, and a magnetic sensor 260, and the driving tracking may also be automatically ended according to variation of sensing values sensed by the sensors. Separately, the driving tracking may be selectively turned on or turned off by a user operation. The bicycle may be known to be in the driving, and the controller may calculate driving information such as a driving distance, a driving velocity, and the like using at least one sensing value of the sensors. Further, when the bicycle is in the driving, the controller prevents locking of the bicycle locking device 10 due to the operation of the driving part 200. Disposition of the magnetic sensor 260 will be described below in a description of FIG. 14.

Further, the bicycle locking device 10 may further include a notification part (not shown), and the notification part may include the LED module located at one side surface of the locking device to perform notification through the lighting at locking or unlocking, and the sound output module configured to perform notification through notification sound output at the locking or the unlocking. The LED module may be located at the PCB substrate 440. The LED module may be provided in plural to be disposed along an outer circumference of the PCB substrate 440 at a uniform interval, and the number and disposition method of the LED modules are not limited thereto.

Figure 5:
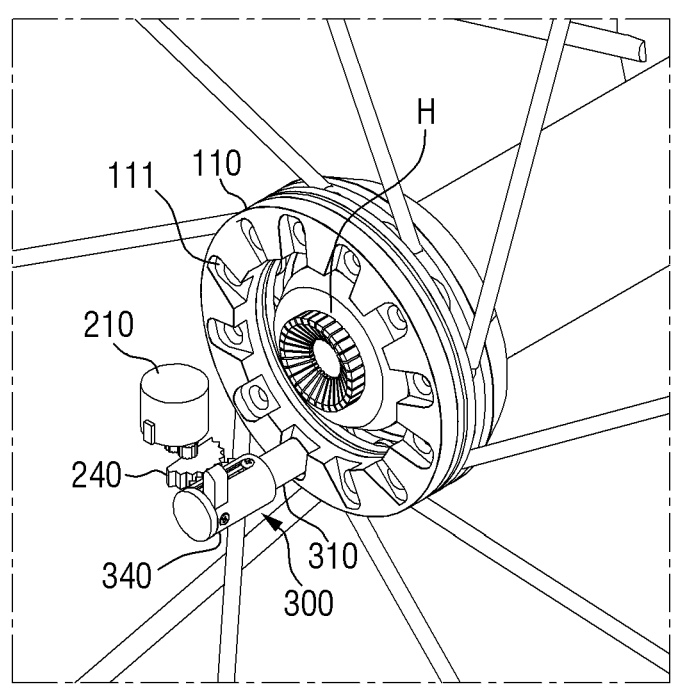
FIG. 5 is a view illustrating a state in which the fastening part and the locking part are coupled in a locked state of the bicycle locking device according to the embodiment of the present invention.
Figure 6:
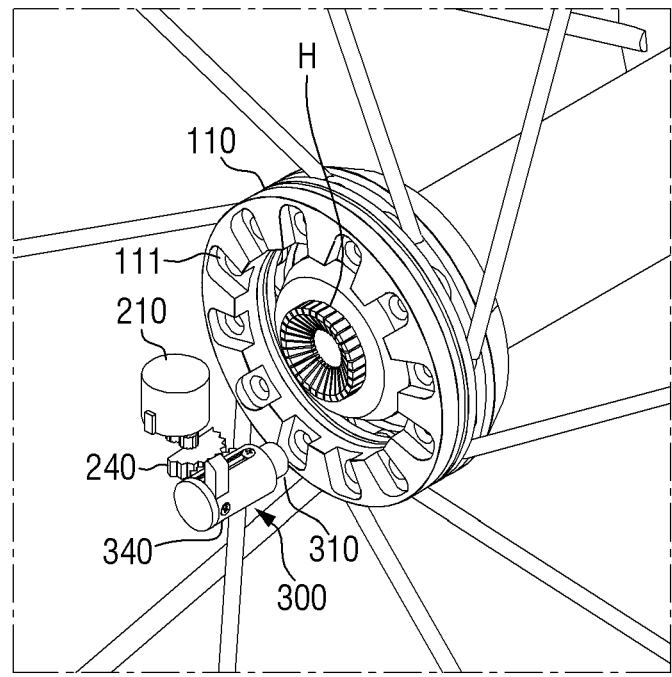
FIG. 6 is a view illustrating a state in which the fastening part and the locking part are separated in an unlocked state of the bicycle locking device according to the embodiment of the present invention.

FIG. 5 illustrates a state in which the fastening part 100 and the locking part 300 are coupled in the locked state of the bicycle locking device 10 according to the embodiment of the present invention, and FIG. 6 illustrates a state in which the fastening part 100 and the locking part 300 are separated in the unlocked state of the bicycle locking device 10 according to the embodiment of the present invention.

When the bicycle locking device 10 according to the embodiment of the present invention is locked, the motor 210 of the driving part 200 operates to move the pin case 340, and the pin 310 in the pin case 340 is engaged with the outer fastening member 110 coupled to the hub H of the bicycle. Specifically, the motor 210 receives the driving signal and operates to rotate the gear 240 connected to the motor 210. The gear 240 is rotated to move the rack 342, which is engaged therewith, in a frontward direction. Since the rack 342 moves in the frontward direction, the pin case 340 moves in a frontward direction. Since the pin case 340 moves in the frontward direction, the second spring 320 is compressed. The pin 310 accommodated in the pin case 340 moves in a frontward direction together with the pin case 340 to be inserted into the groove 111 of the outer fastening member 110. Accordingly, the outer fastening member 110 may be fixed and the hub H of the bicycle coupled to the outer fastening member 110 may also be fixed to prevent rotation of the wheel W. Due to a reaction force of the first spring 330, the pin 310 may be fastened to the groove 111 of the outer fastening member 110 through predetermined rotation of the wheel W even when the pin 310 is not accurately fastened to the groove 111 of the outer fastening member 110.

On the other hand, when the bicycle locking device 10 is unlocked, the motor 210 operates in a direction opposite a direction in the locked state to move the pin 310 of the locking part 300 in a direction opposite the outer fastening member 110, and accordingly, the outer fastening member 110 and the pin 310 may be separated from each other. When the bicycle locking device 10 is unlocked, the second spring 320 provides an elastic force to the pin 310 to support the pin 310 to be separated from the outer fastening member 110 together with the operation of the motor 210. This is because separation of the pin 310 may not be smoothly performed with just power of the motor 210 when the outer fastening member 110 and the pin 310 are strongly fastened to each other by friction. Accordingly, the outer fastening member 110 is unfixed and unlocked and thus the wheel W becomes rotatable.

Hereinafter, a shape and arrangement of the groove 111 of the outer fastening member 110 will be described with reference to FIGS. 7 and 8.

Figure 7:
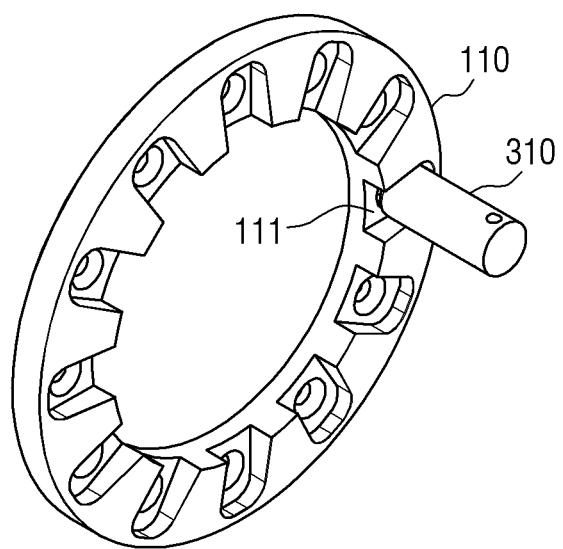
FIG. 7 is a view illustrating a situation in which a pin is fastened to an area, which is distant from a center of an outer fastening member, among grooves of the outer fastening member of the bicycle locking device according to the embodiment of the present invention.
Figure 8:
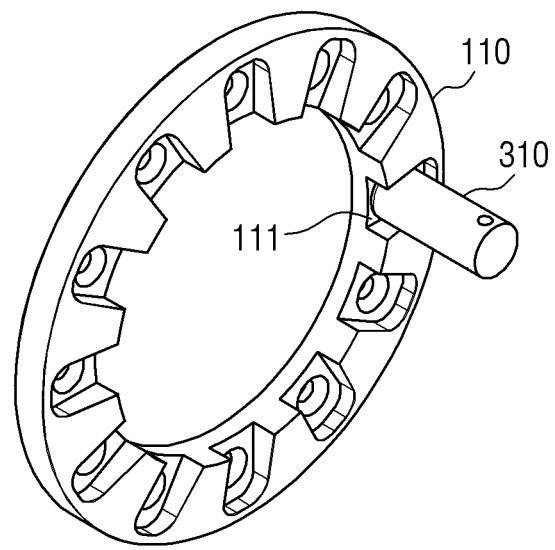
FIG. 8 is a view illustrating a situation in which the pin is fastened to an area, which is close to the center of the outer fastening member, among the grooves of the outer fastening member of the bicycle locking device according to the embodiment of the present invention.

FIG. 7 is a view illustrating a situation in which the pin 310 is fastened to an area, which is distant from a center of the outer fastening member 110, among the grooves 111 of the outer fastening member 110 of the bicycle locking device 10 according to the embodiment of the present invention, and FIG. 8 is a view illustrating a situation in which the pin 310 is fastened to an area, which is close to the center of the outer fastening member 110, among the grooves 111 of the outer fastening member 110 of the bicycle locking device 10 according to the embodiment of the present invention.

Referring to FIGS. 7 and 8, at least one groove 111 is formed in the outer fastening member 110 of the bicycle locking device 10. Since a concave groove 111 is formed in one side surface of the outer fastening member 110, a space into which the pin 310 may be inserted is formed, and since the inserted pin 310 is fastened to the groove 111, the outer fastening member 110 and the locking part 300 are coupled to each other. Since the outer fastening member 110 and the locking part 300 are coupled to each other, the bicycle wheel W is locked.

The groove 111 may be formed in the outer fastening member 110 in plural to reduce inconvenience that the wheel W has to be rotated to find an accurate location in which the groove 111 and the pin 310 may be coupled to each other. The plurality of grooves 111 may be arranged along an inner circumference of the outer fastening member 110 at a uniform interval. As described above, the pin 310 has the first spring 330 and thus may roll the wheel W so that the pin 310 may be inserted into the groove 111 even when the pin 310 comes into contact with a surface which is not the groove 111 among side surfaces of the outer fastening member 110.

In the case in which the groove 111 is formed in a cylindrical shape to accurately correspond to an exterior of the pin 310, the pin 310 may not be inserted into the groove 111 even when the pin 310 and the groove 111 are arranged to be slightly dislocated. Accordingly, to solve this problem, the groove 111 of the outer fastening member 110 may be formed in a shape which is open toward the center of the outer fastening member 110. As shown in FIGS. 7 and 8, the pin 310 may be inserted into the groove 111 and thus the wheel W may be locked normally by the groove 111 formed to be elongated and open toward the center even when centers of the pin 310 and the groove 111 are not accurately arranged.

Figure 9:
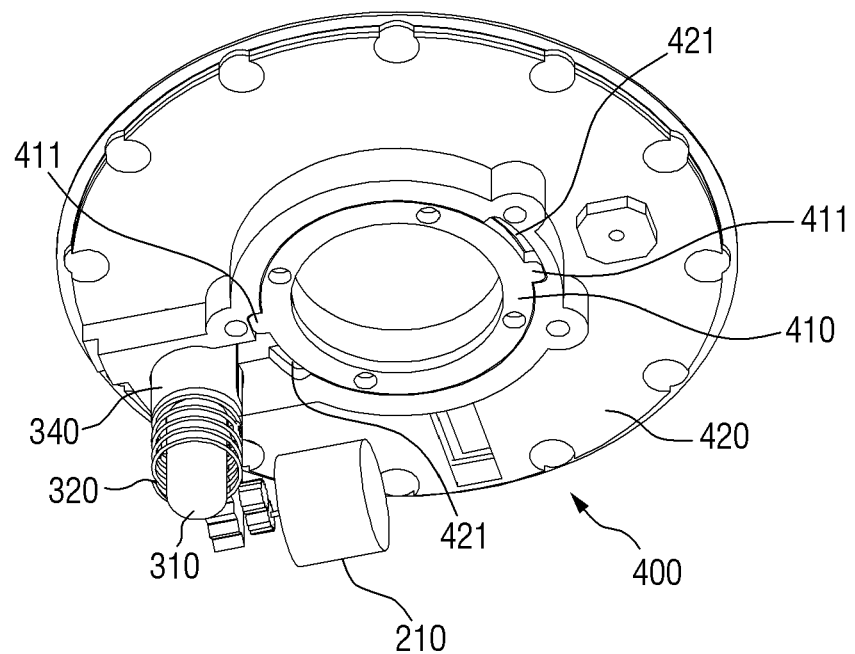
FIGS. 9 and 10 are views illustrating a state in which a cover part and a pin case protrusion are separable in the unlocked state of the bicycle locking device according to the embodiment of the present invention.
Figure 10:
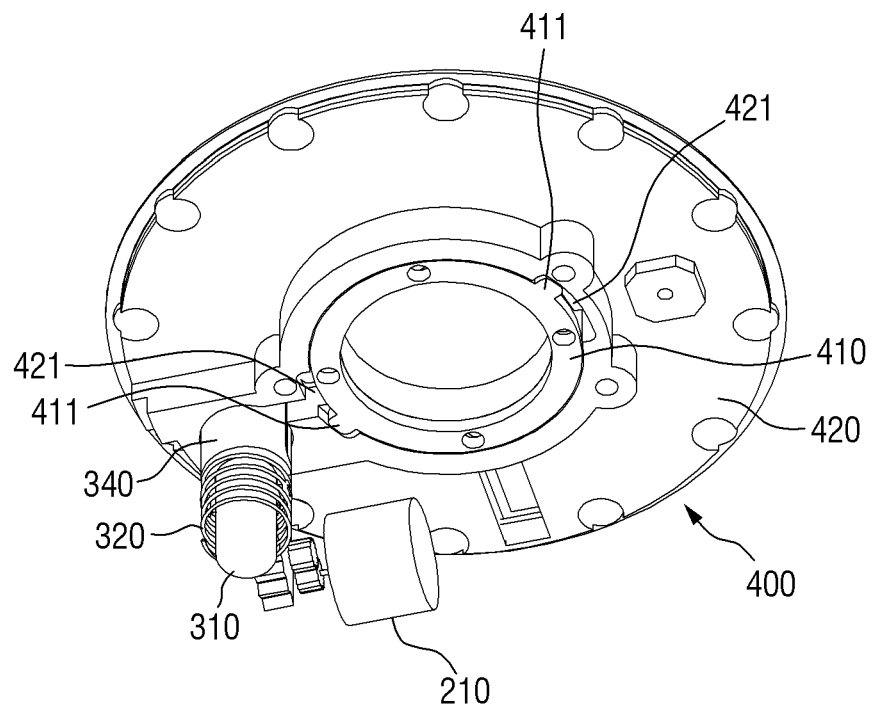
Figure 11:
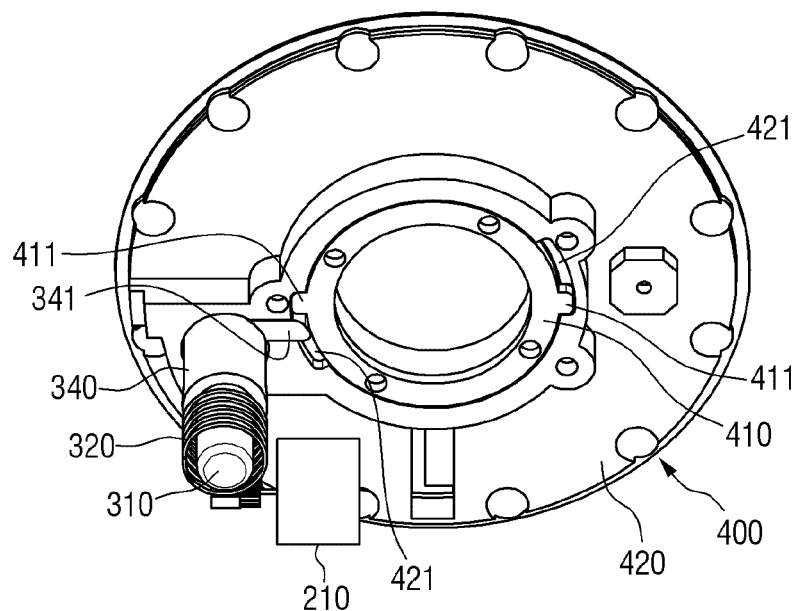
FIG. 11 is a view illustrating a state in which the pin case protrusion blocks the cover part in the locked state of the bicycle locking device according to the embodiment of the present invention and thus the cover part is inseparable.

FIGS. 9 and 10 are views illustrating a state in which the cover part 400 and the pin case protrusion 341 are separable in the unlocked state of the bicycle locking device 10 according to the embodiment of the present invention, and FIG. 11 is a view illustrating a state in which the pin case protrusion 341 blocks the cover part 400 in the locked state of the bicycle locking device 10 according to the embodiment of the present invention and thus the cover part 400 is inseparable.

Referring to FIGS. 9 to 11, the bicycle locking device 10 according to the embodiment of the present invention may further include the cover part 400 connected to the outer case 230 included in the driving part 200 and located at one side surface of the locking device. When the locking device is locked, the cover part 400 and the locking part 300 may be engaged with each other and thus rotation and opening of the cover part 400 may be prevented, and when the locking device is unlocked, the cover part 400 and the locking part 300 may be no longer engaged with each other and thus the cover part 400 may be rotatable and openable.

In the case in FIGS. 9 and 10 in which the bicycle locking device 10 according to the embodiment of the present invention is unlocked, since the locking part 300 is moved in the direction opposite the outer fastening member 110, coupling of the pin case protrusion 341 and a first cover protrusion 411 is released. Accordingly, the first cover protrusion 411 becomes movable in a slot of the second cover 420, and the first cover 410 may be rotatable to open the cover part 400. FIGS. 9 and 10 each illustrate situations in which the first cover 410 rotates with respect to the second cover 420 to be located at a cover unremovable location and a cover removable location.

On the other hand, in the case in FIG. 11 in which the bicycle locking device 10 according to the embodiment of the present invention is locked, the locking part 300 is moved toward the outer fastening member 110 due to the driving of the driving part 200, and the pin case protrusion 341 comes into contact with the first cover protrusion 411. Accordingly, since the pin case 340 and the first cover 410 are engaged with each other, and the locking part 300 including the pin case 340 is fixed to the inside of the outer case 230, rotation of the first cover 410 engaged with the pin case 340 is prevented. Accordingly, since the first cover 410 may not be rotated by the user operation to be located at the unlocking location, the cover part 400 may not be opened.

Figure 12:
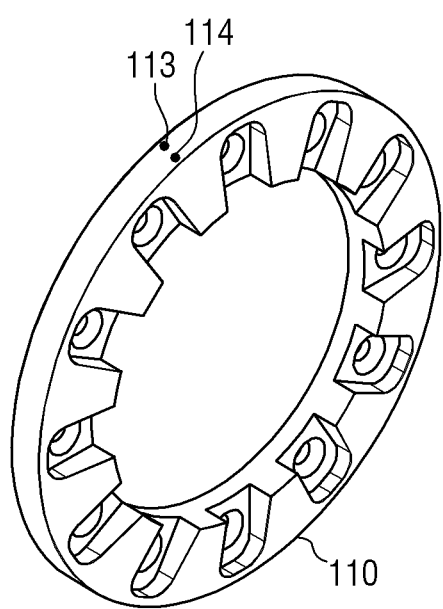
FIG. 12 is a perspective view of an outer fastening member in which a marker is formed on an outer circumferential surface of the bicycle locking device according to the embodiment of the present invention.
Figure 13:
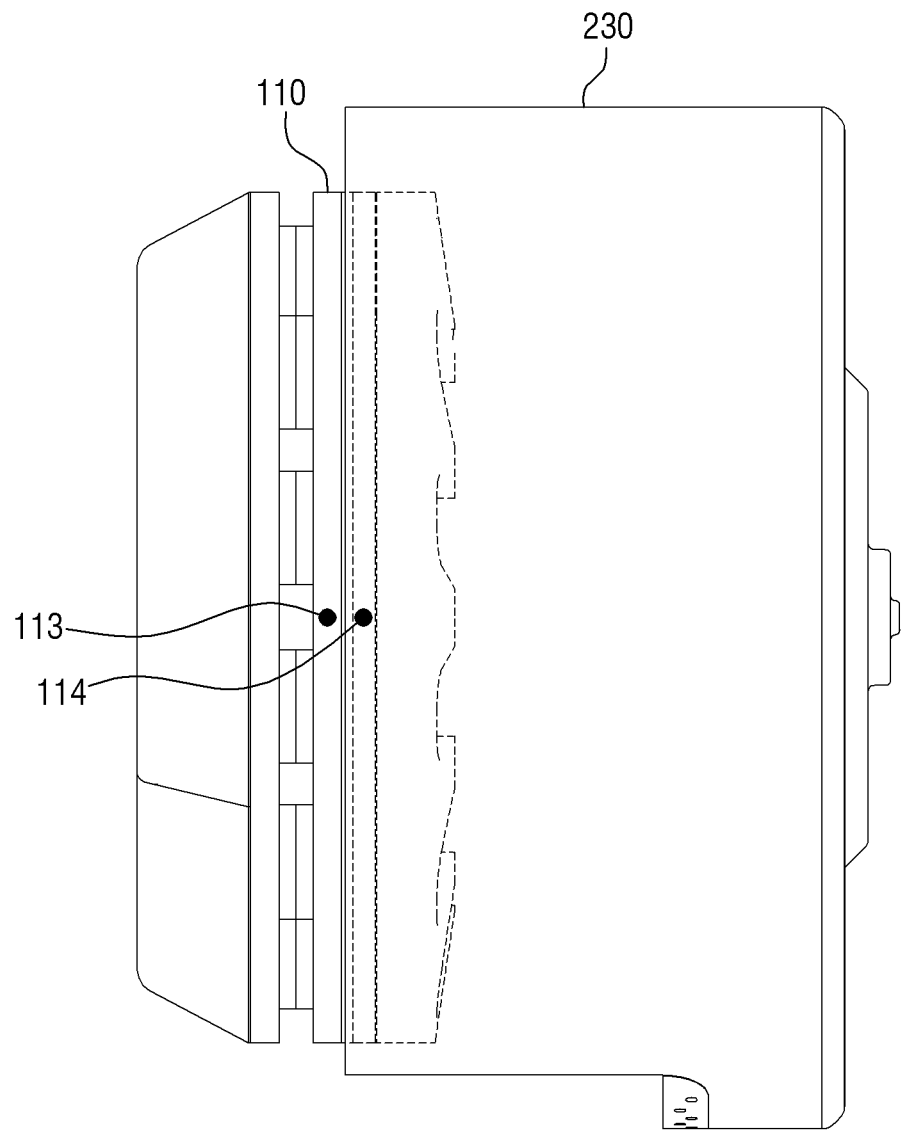
FIG. 13 is a side view illustrating a state in which the outer fastening member is normally assembled and partially accommodated in an outer case.

FIG. 12 is a perspective view of an outer fastening member 110 in which a marker is formed on an outer circumferential surface of the bicycle locking device 10 according to the embodiment of the present invention, and FIG. 13 is a side view illustrating a state in which the outer fastening member 110 is normally assembled and partially accommodated in the outer case 230.

Referring to FIG. 12, a marker may be formed on an outer circumferential surface of the outer fastening member 110. As shown in the embodiment of the present invention, two markers having different colors may be disposed on the outer circumferential surface of the outer fastening member 110 one by one along a rotating axis direction of the outer fastening member 110, but arrangement of the marker is not limited thereto, and for example, one circular marker may be disposed.

Referring to FIG. 13, when the bicycle locking device 10 is coupled to the bicycle, the outer fastening member 110 is disposed to be spaced apart from the outer case 230 at a predetermined interval. This is because since the outer fastening member 110 is coupled to the hub H of the bicycle wheel W to rotate with the bicycle wheel W but the outer case 230 is coupled to the fork F of the bicycle and does not rotate, friction may be generated when the outer fastening member 110 and the outer case 230 are disposed to be come into contact with each other.

The interval between the outer fastening member 110 and the outer case 230 has to be an interval in which the pin 310 of the locking part 300 may be moved by the driving part 200 to be inserted into the groove 111 of the outer fastening member 110 in the locked state and the pin 310 of the locking part 300 may be moved by the driving part 200 to be separated from the groove 111 of the outer fastening member 110 in the unlocked state. Accordingly, maintaining an appropriate interval is important but since the outer fastening member 110 is partially inserted into the outer case 230 to be covered, whether the appropriate interval is maintained is not easily determined by naked eyes.

Since the marker is formed on the outer circumferential surface of the outer fastening member 110 according to the embodiment of the present invention, whether the appropriate interval is maintained may be checked through a degree of exposure of the marker. A first marker 113 is formed at an area of the outer circumferential surface of the outer fastening member 110 which is close to one side surface of the outer fastening member 110, and a second marker 114 is formed at an area of the outer circumferential surface of the outer fastening member 110 which is close to the other side surface of the outer fastening member 110. At the same time, only one marker of the markers can be checked from the outside when the outer fastening member 110 and the outer case 230 are normally assembled and the other marker is placed at a location covered by the outer case 230. Accordingly, as shown in FIG. 13, the outer fastening member 110 and the outer case 230 are correctly mounted to maintain the appropriate interval. The outer fastening member 110 and the outer case 230 maintain an interval greater than the appropriate interval when one marker and the other marker are partially exposed to the outside, and the outer fastening member 110 and the outer case 230 maintain an interval smaller than the appropriate interval when only the one marker is not entirely but partially exposed.

Figure 14:
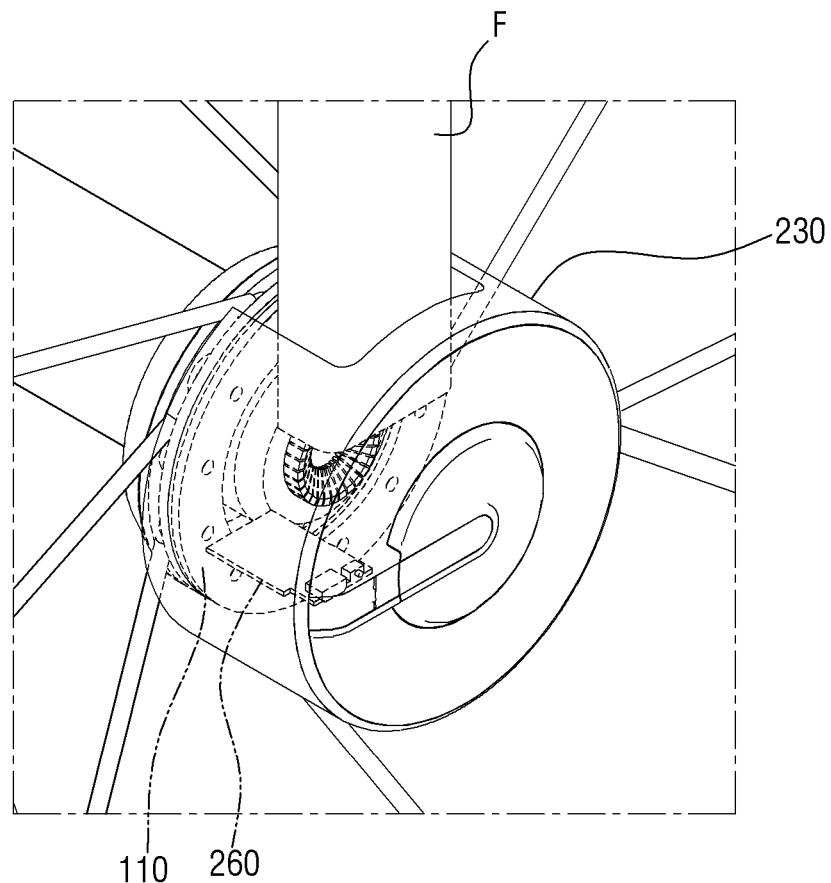
FIG. 14 is a perspective view illustrating a situation in which a magnetic sensor is installed in the bicycle locking device according to the embodiment of the present invention.

FIG. 14 is a perspective view illustrating a situation in which the magnetic sensor 260 is installed in the bicycle locking device 10 according to the embodiment of the present invention.

The outer fastening member 110 of the bicycle locking device 10 according to the embodiment of the present invention may be made of a material of which a partial area has magnetism, or may have a magnet accommodated in an inner space thereof. Accordingly, a magnetic force varying during rotation of the outer fastening member 110 may be measured by closely disposing the magnetic sensor 260 coupled to the outer case 230. The outer fastening member 110 which does not include a separate sensor and a separate sensing part and performs a locking function is used.

A lead switch, a hall sensor, or the like may be used instead of the magnetic sensor 260, but the kind thereof is not limited thereto.

A power generation magnet (not shown) disposed to be spaced apart from the outer fastening member 110, and rotatably coupled to the outer case 230 to be rotatable by the magnetic force varying according to the rotation of the outer fastening member 110 may be further provided. In addition, since a magnet is embedded in the outer fastening member 110 and variation of the magnetic force is transferred to a power generator accommodated in the outer case 230, power may be produced. The power may be generated using the rotation of the wheel W.

Figure 15:
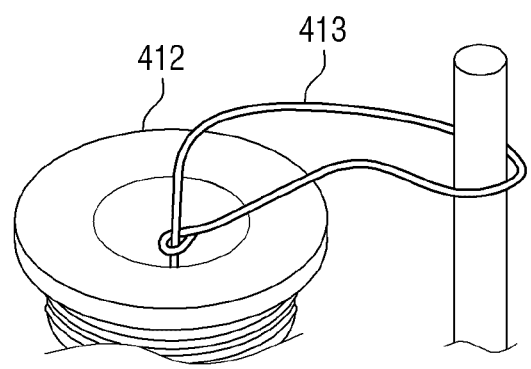
FIG. 15 is a schematic view illustrating a cover part to which a cable is connected in a bicycle locking device according to another embodiment of the present invention.

FIG. 15 is a schematic view illustrating a state of a cover part 400 of a bicycle locking device 10 according to another embodiment of the present invention to which a cable 413 is connected.

According to another embodiment of the present invention, a theft prevention cable 413 may be connected to a first cover 410. The bicycle locking device 10 of the present invention is provided to prevent relative movement of a wheel W and a bicycle main body to lock the bicycle, and thus may not be effective to prevent a case of stealing a bicycle by carrying a bicycle body. Accordingly, a lock cable 413 for a general bicycle may be connectable to a cover part 400 to provide against the above-described case.

The lock cable 413 surrounds a fixable object and has one end connected to the first cover 410. The one end of the cable 413 may be coupled to a locking part 300 with a first cover protrusion 411 and thus separation may be prevented when the bicycle locking device 10 is locked.

According to still another embodiment of the present invention, at least one first cover connector may be formed on the first cover 410, and a second cover connector formed at a location corresponding to the first cover connector may be formed on the second cover 420. When the first cover 410 is assembled to the second cover 420, the first cover connector and the second cover connector may come into contact with each other to be electrically connected to each other. The second cover connector may be electrically connected to a PCB substrate 440 which is located at a lower end thereof, and accordingly, the first cover 410 may be electrically connected to the PCB substrate 440. Accordingly, power and a control signal are supplied to the first cover 410 and thus an LED, a speaker module, and the like may be used in the cover.

A method of modularizing the cover using wireless communication such as Bluetooth, ANT+, or the like in addition to a method of using an electrical contact point may be used as a method of connecting the first cover 410 and the second cover 420.

Figure 16:
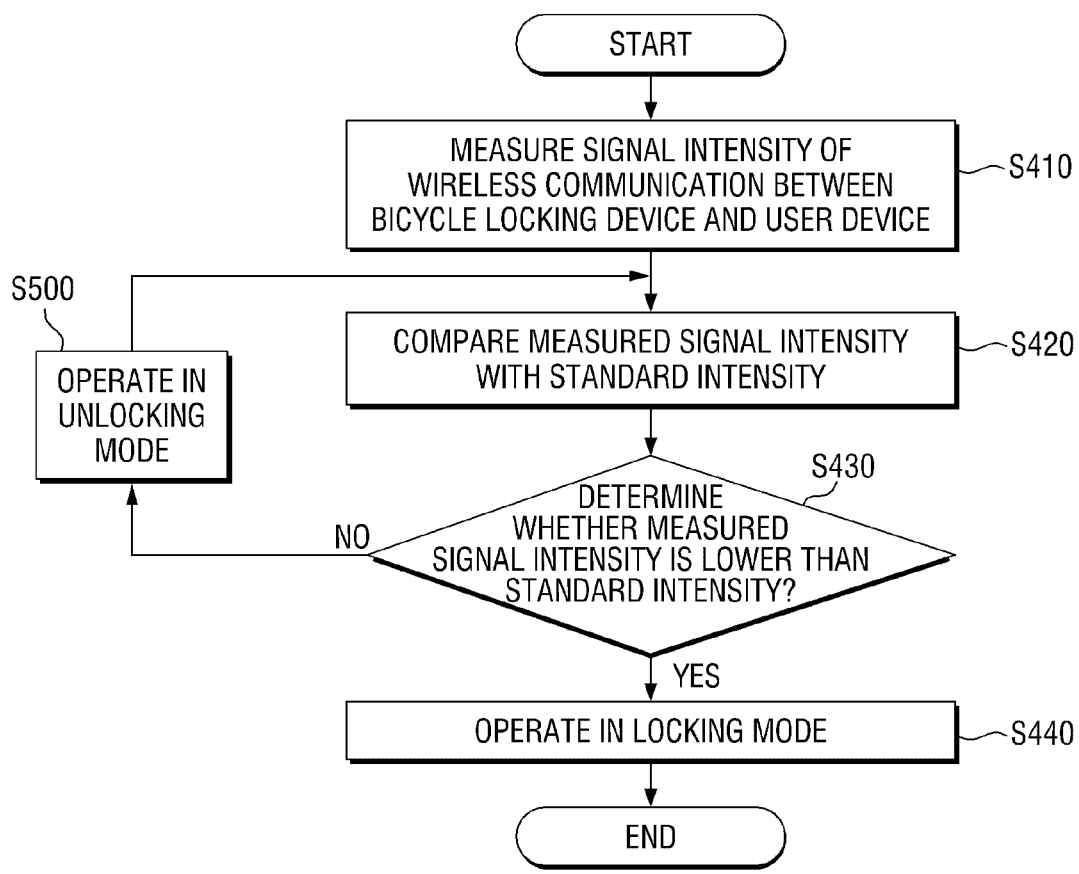
FIG. 16 is a flowchart in which a locking mode or an unlocking mode of a bicycle locking method according to an embodiment of the present invention is operated.

FIG. 16 is a flowchart in which a locking mode or an unlocking mode of a bicycle locking method according to an embodiment of the present invention is operated.

A bicycle locking method may be provided as another embodiment of the present invention.

Referring to FIG. 16, the bicycle locking method according to the embodiment of the present invention may include measuring signal intensity of wireless communication between the bicycle locking device 10 and the user device (S100), comparing the measured signal intensity with a predetermined standard intensity (S200), allowing the bicycle locking device 10 to operate in the locking mode when the measured signal intensity is less than the standard intensity as a comparison result (S300 and S400).

Further, allowing the bicycle locking device 10 to operate in the unlocking mode when the above-described measured signal intensity is not less, but greater than or equal to the standard intensity (S500) may be further included.

Figure 17:
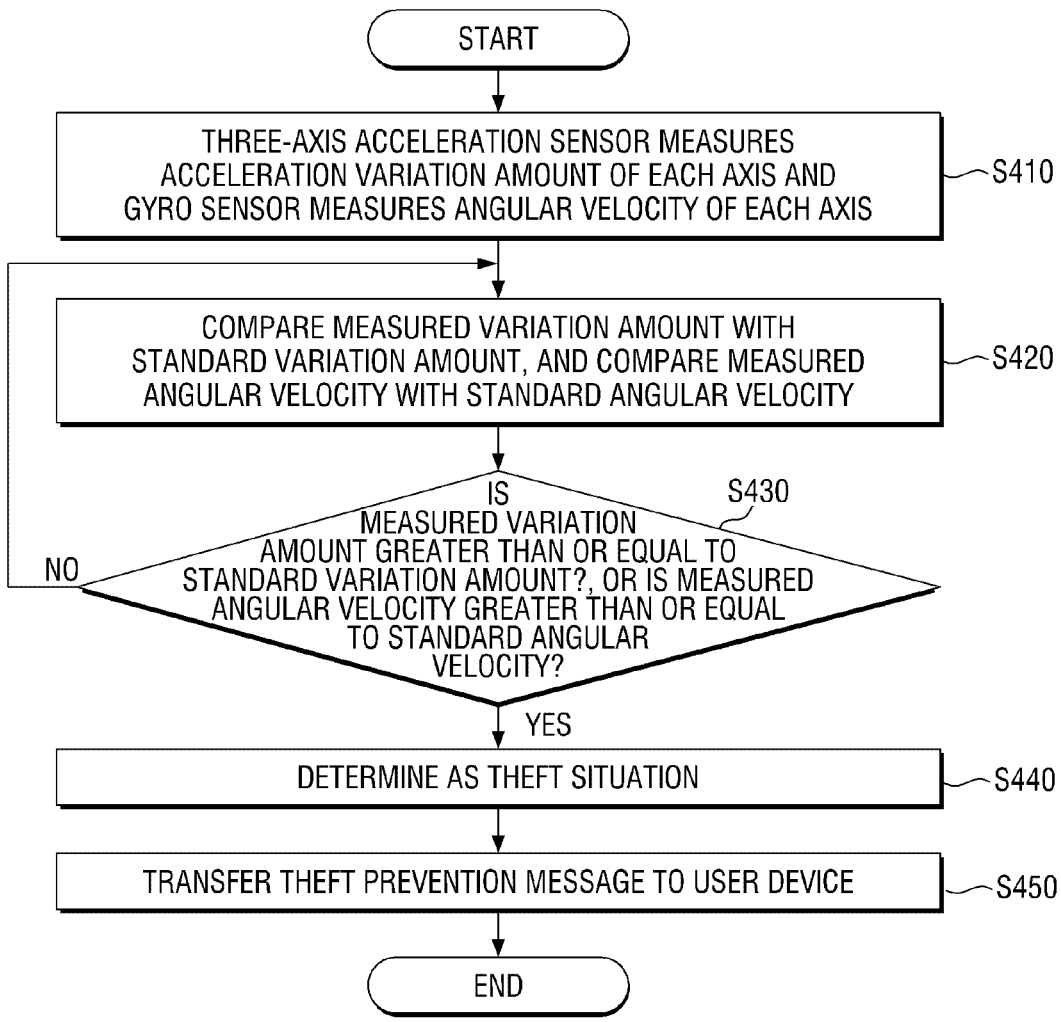
FIG. 17 is a flowchart in which a theft situation in the locking mode of the bicycle locking method according to the embodiment of the present invention is determined.

FIG. 17 is a flowchart in which a theft situation in the locking mode of the bicycle locking method according to the embodiment of the present invention is determined.

Referring to FIG. 17, the bicycle locking method according to the embodiment of the present invention may further include measuring, by an acceleration sensor, an acceleration variation amount of each axis, and measuring, by a gyro sensor, an angular velocity of each axis (S410), comparing the measured variation amount with a predetermined standard variation amount, and comparing the measured angular velocity with the standard angular velocity (S420), determining as a theft situation when the measured variation amount is greater than or equal to the standard variation amount, or the measured angular velocity is greater than or equal to the standard angular velocity as a comparison result (S430, S440), and transferring a theft prevention message to the user device according to the determined theft situation (S450).

In the bicycle locking method according to the embodiment of the present invention, an LED module or a sound output module attached to the bicycle may operate and thus lighting may be performed or a sound may be output at determination of the locking mode, the unlocking mode, or the theft signal.

Content of the above-described device may be applied to the method according to the embodiment of the present invention. Accordingly, in the method, content the same as the content of the above-described device is omitted.

The embodiment of the present invention may be implemented into a recording medium form including instructions executable by a computer such as a program module executed by the computer. A computer-readable medium may be any available medium accessible by the computer, and includes all of volatile and nonvolatile media, and separable and nonseparable media.

Further, the computer-readable medium may include all computer storage media and communication media. The computer storage media include all of volatile and nonvolatile media, and separable and nonseparable media implemented by a method or technology for storing information such as computer-readable instructions, a data structure, a program module, or other data. The communication media generally include a transmission mechanism of computer-readable instructions, a data structure, a program module, other data of a modulated data signal such as a carrier wave, or the like, and include an arbitrary information transmission medium.

The above-described descriptions of the present invention are exemplary, and those skilled in the art of the present invention may understand that the present invention may be embodied in other specific forms without changing the technical spirit or essential characteristics. Accordingly, the above-described embodiments should be understood to be exemplary and not limiting. For example, each component described as a single entity may be distributed and implemented, and components described as being dispersed may be implemented in an integrated form.

The scope of the present invention is shown by the claims rather than the detailed description, and all of variations or different forms derived from the means, scope, and equivalents of the claims should be interpreted to be included in the scope of the present invention.

The invention claimed is:

1. A bicycle locking device comprising:
    a fastening part including an inner fastening member positioned on an inner side surface of a bicycle hub, and an outer fastening member positioned on an outer side surface of the hub and coupled to the inner fastening member;
    a driving part coupled to one side surface of the outer fastening member and including a motor and an outer case; and
    a locking part including a pin case, a pin positioned in the pin case, a pin case cover coupled to an upper end of the pin case, and a first spring coupled to the pin case cover and the pin to support the pin to be pitchable with respect to the pin case,
    wherein:
    the locking part is located in the driving part;
    the pin case connected to the motor moves in a frontward direction and thus the pin is inserted into a groove of the outer fastening member to prevent rotation of the hub when the motor is operated by a driving signal applied thereto; and
    the pin is easily inserted into the groove of the outer fastening member by an elastic force of the first spring when a bicycle wheel has predetermined rotation.

2. The bicycle locking device of claim 1, further comprising:
    a controller configured to control an operation of the driving part; and
    a communication part connected to a user device through wireless communication,
    wherein the communication part receives a driving signal from the user device to transmit the driving signal to the controller.

3. The bicycle locking device of claim 2, wherein:
    the wireless communication includes Bluetooth; and
    when signal intensity of the Bluetooth is measured to be lower than or equal to a predetermined value, the controller controls the operation of the driving part to couple the locking part to the fastening part.

4. The bicycle locking device of claim 2, further comprising at least one of an acceleration sensor configured to measure an acceleration variation amount of each axis and a gyro sensor configured to measure an angular velocity of each axis,
    wherein the controller transfers a theft prevention message to the user device through the communication part in a case in which the measured acceleration variation amount is greater than or equal to a predetermined standard variation amount or the measured angular velocity is greater than or equal to a predetermined standard angular velocity.

5. The bicycle locking device of claim 4, further comprising a notification part, wherein the notification part includes:
    an LED module located on one side surface of the bicycle locking device to perform notification through lighting in the case in which the measured acceleration variation amount is greater than or equal to the predetermined standard variation amount or the measured angular velocity is greater than or equal to the predetermined standard angular velocity; and
    a sound output module configured to perform notification through output of a notification sound in the case in which the measured acceleration variation amount is greater than or equal to the predetermined standard variation amount or the measured angular velocity is greater than or equal to the predetermined standard angular velocity.

6. The bicycle locking device of claim 4, further comprising a magnetic sensor configured to sense a rotation velocity of the bicycle wheel,
   wherein the controller determines a driving state of a bicycle on the basis of at least one of the sensed rotation velocity, the measured acceleration variation amount, and the measured angular velocity.

7. The bicycle locking device of claim 1, further comprising a notification part,
   wherein the notification part includes:
   an LED module located on one side surface of the bicycle locking device to perform notification through lighting at locking or unlocking; and
   a sound output module configured to perform notification through output of a notification sound at locking or unlocking.

8. The bicycle locking device of claim 1, further comprising a cover part connected to the driving part,
   wherein:
   in a locked state, the cover part and the locking part are coupled to prevent rotating and opening of the cover part; and
   in an unlocked state, the coupling of the cover part and the locking part is released so that the cover part is rotatable and openable.

9. The bicycle locking device of claim 8, wherein the cover includes a cable of which one end is connected to the cover,
   wherein the one end of the cable is connected to the cover not to be separated from the cover in the locked state.

10. The bicycle locking device of claim 8, wherein the cover includes:
    a first cover including a first cover connector; and
    a second cover including a second cover connector which comes into contact with and is electrically connected to the first cover connector, and to which the first cover is detachably coupled.

11. The bicycle locking device of claim 1, wherein the fastening part further includes at least one spacer disposed between the inner fastening member and the outer case.

12. The bicycle locking device of claim 1, wherein the fastening part further includes a rubber pad disposed between the inner fastening part and the hub or between the hub and the outer fastening part.

13. The bicycle locking device of claim 1, wherein:
    the driving part further includes a gear connected to the motor;
    the locking part further includes a rack formed on the pin case and engaged with the gear; and
    when the motor is operated by the driving signal applied thereto, the gear connected to the motor rotates and the pin case connected to the gear moves, and thus the pin is coupled to the outer fastening member to prevent the rotation of the hub.

14. The bicycle locking device of claim 13, wherein the outer fastening member includes at least one groove to which the pin is coupled,
    wherein the at least one groove is arranged along an inner circumference of the outer fastening member.

15. The bicycle locking device of claim 14, wherein the at least one groove is open toward a center of the outer fastening member.

16. The bicycle locking device of claim 1, wherein:
    a first marker is formed in a partial area, which is accommodated in the outer case, of an outer circumferential surface of the outer fastening member in a normal assembly state; and
    a second marker is formed in a partial area, which is exposed to the outside, of the outer circumferential surface of the outer fastening member in the normal assembly state.

17. The bicycle locking device of claim 1, wherein a partial area of the outer fastening member has magnetism, and
    the bicycle locking device further includes a power generator disposed to be spaced apart from the outer fastening member and configured to generate power by magnetism varying according to rotation of the outer fastening member.

18. The bicycle locking device of claim 1, wherein the locking part further includes a second spring connected to the outer case and the pin case,
    wherein the second spring applies an elastic force to the pin case in an unlocked state so that the pin maintains a state of being separated from the outer fastening member.

* * * * *